(12) United States Patent
Gillis et al.

(10) Patent No.: US 7,810,746 B2
(45) Date of Patent: Oct. 12, 2010

(54) PROCESSING OF STEEL MAKING SLAGS

(75) Inventors: James M. Gillis, Chassell, MI (US); Xiaodi Huang, Houghton, MI (US); Jiann-Yang Hwang, Chassell, MI (US); Peter Larson, Atlantic Mile, MI (US); Kenneth L. Paxton, Lexington, SC (US); Domenic Popko, Negaunee, MI (US); Zhiyong Xu, Houghton, MI (US)

(73) Assignee: Westwood Lands, Inc., Negaunee, MI (US)

( * ) Notice: Subject to any disclaimer, the term of this patent is extended or adjusted under 35 U.S.C. 154(b) by 812 days.

(21) Appl. No.: 11/614,654

(22) Filed: Dec. 21, 2006

(65) Prior Publication Data

US 2008/0148902 A1  Jun. 26, 2008

(51) Int. Cl.
*B02C 19/00* (2006.01)

(52) U.S. Cl. .......................... 241/19; 241/20; 241/24.14

(58) Field of Classification Search .............. 241/24.14, 241/19, 20
See application file for complete search history.

(56) References Cited

U.S. PATENT DOCUMENTS

| | | | |
|---|---|---|---|
| 2,264,204 A | 11/1941 | Heckett | |
| 2,352,712 A | 7/1944 | Heckett | |
| 2,971,703 A | 2/1961 | Rath | |
| 3,049,305 A | 8/1962 | Rath | |
| 3,081,954 A | 3/1963 | Heckett | |
| 3,086,718 A * | 4/1963 | Lukas, Jr. | 241/24.14 |
| 3,165,268 A | 1/1965 | Haussig | |
| 3,330,644 A | 7/1967 | Haussig | |
| 4,502,179 A | 3/1985 | Coughlin et al. | |
| 4,666,591 A | 5/1987 | Imai et al. | |
| 4,747,547 A | 5/1988 | Harada | |
| 5,961,055 A | 10/1999 | Lehtinen | |
| 6,258,150 B1 | 7/2001 | MacKellar | |

OTHER PUBLICATIONS

International Search Report for PCT/US07/84125, Mar. 31, 2008, 2 pgs.

* cited by examiner

*Primary Examiner*—Faye Francis
(74) *Attorney, Agent, or Firm*—Reising Ethington P.C.

(57) ABSTRACT

A process for separating different products from steelmaking slag includes reducing the average particle size of slag from a steelmaking process into fine particle size material, and separating the fine particle size material into at least an iron rich product and a silicate rich product based on the differences between these products in at least one or more properties including magnetic susceptibility, particle size or specific gravity.

20 Claims, 3 Drawing Sheets

| Table 1. Particle Size Distribution and Iron Contents ||||
|---|---|---|---|
| Screen Size | Weight % | Metallic Iron % | Total Iron % |
| +1/2" | 0.00 | 0.00 | 0.00 |
| +3 Mesh | 1.72 | 43.47 | 52.27 |
| +8 Mesh | 39.06 | 39.20 | 48.86 |
| +14 Mesh | 18.33 | 33.96 | 37.01 |
| +28 Mesh | 14.65 | 37.93 | 44.04 |
| +65 Mesh | 14.52 | 23.74 | 34.34 |
| +100 Mesh | 4.15 | 15.25 | 19.57 |
| +150 Mesh | 2.58 | 11.65 | 20.69 |
| +200 Mesh | 2.41 | 12.70 | 17.66 |
| -200 Mesh | 2.58 | 7.73 | 16.28 |
| Total | 100.00 | 32.73 | 40.40 |

PROCESSING OF STEEL MAKING SLAGS

FIELD OF THE INVENTION

The present invention relates generally to byproducts of the steel making process and more particularly to methods for processing steel making slags.

BACKGROUND OF THE INVENTION

Steel making slags are the byproducts of the steel making processes. Typically, steel making slags are produced from the basic oxygen furnace of the steel mills, and there are several kinds of slags produced from iron and steel making facilities. Blast furnaces are generally utilized to reduce iron oxide to iron. The slag generated from blast furnaces is referred to as BF slag. Next, the iron may go through a desulfurization step to remove sulfur from the iron. The slag generated here may be called desulfurization slag, and it may be rich in sulfur. Lastly, the desulfurized iron is placed in a basic oxygen furnace (BOF) to convert iron to steel by removing carbon and other impurities. Slags may also be produced from electric arc furnaces (EAF).

It currently is believed that the steel industry in the United States generates about 30 million tons of byproducts each year. The majority of these byproducts are present in various forms of slags, sludges and dusts. There may be about 12.5 million tons of BF slag, 6 million tons of BOF type slag, 4.5 million tons of EAF slag, 1.5 million tons of desulfurization slag, 2 million tons of BF and BOF sludges and 1 million tons of dust. Previous efforts of processing such byproducts have achieved only limited success. As a result, large amounts of byproducts of various types and qualities have been stockpiled at steel mills where available space is diminishing. Additionally, valuable minerals and materials lie within the slag, unused and wasted.

SUMMARY OF THE INVENTION

A process for separating different products from steelmaking slag includes reducing the average particle size of slag from a steelmaking process into fine particle size material, and separating the fine particle size material into at least an iron rich product and a silicate rich product based on the differences between these products in at least one or more properties including magnetic susceptibility, particle size or specific gravity.

In one implementation, the slag material is reduced in size until it has an average particle size of about 25 to 400 mesh. Moisture removal may be employed prior to or while the particle size is being reduced, such as by crushing or grinding. Thereafter, a gravitational separation may be utilized, and that separation may be assisted by an airflow that lifts lighter materials and permits heavier materials to sink or not be lifted. In general, the heavier materials have a higher iron content and may be placed into a group separate from the lighter materials. A magnetic separation may also be utilized and that process may also be assisted by an airflow, if desired. Lower magnetic field strengths may be used to attract more highly magnetic particles that have higher total iron content. Varying magnetic field strengths may be used to separate the material into varying groups of differing iron content. And particle size separation can be employed, such as be screening the material. In general, the larger particles in dry and crushed or ground slag material is higher in iron content. This provides the basis for one or more separation steps based on particle size. Of course, all of the methods may be utilized in one process to provide a number of different products or groups of materials usually including at least one of each of a metallic iron rich product, an iron oxide product and a silicate rich product.

BRIEF DESCRIPTION OF THE DRAWINGS

These and other objects, features and advantages of the present invention will be apparent from the following detailed description of preferred embodiments and best mode, appended claims and accompanying drawings in which:

DETAILED DESCRIPTION OF PREFERRED EMBODIMENTS

Figure 1:
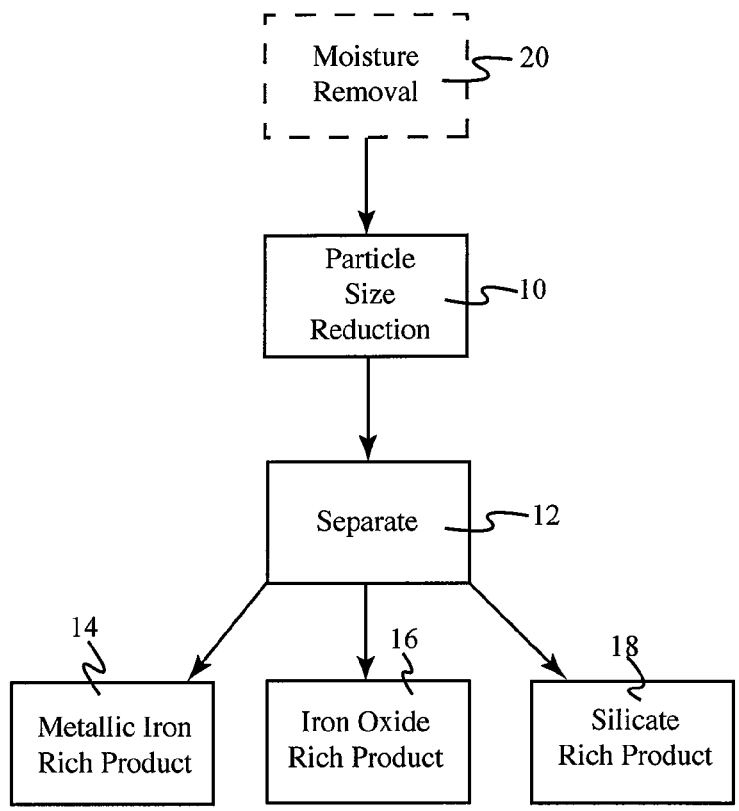
FIG. 1 is a diagram illustrating a general method of processing steelmaking slag into various products or product groups.

Referring in more detail to the drawings, FIG. 1 illustrates a general process flow for one implementation of a method for processing steel making byproducts or slag. In general terms, the slag is ground or otherwise reduced in size at 10 to liberate the mineral and metal components in the slag and reduce the material to particles of relatively fine or small size. The fine particle size material is then separated at 12 based on differences between the magnetic susceptibility, particle size, and/or specific gravity or specific density of the components of the material. In one implementation of the process, the material is separated into at least one iron rich product and at least one silicate rich product. In one further form, the material is separated into at least one metallic iron rich product 14, at least one iron oxide rich product 16, and at least one silicate rich product 18.

In one implementation one or more separation techniques are employed to separate the slag material into a metallic iron rich product, an iron oxide rich product and a silicate rich product. In one such implementation, the metallic iron rich product includes more than 70% total iron content, the iron oxide rich product generally includes about 30-70% total iron content, and the silicate rich product includes less that 30% total iron content. In general, the higher the total iron content in the metallic iron and iron oxide rich products, the better or more desirable the products are in the market. A portion of the total iron content in the iron-oxide rich product may be contributed by metallic iron and/or iron in silicate or other minerals. The silicate rich product may have an average particle size smaller than 65 mesh. In general, the smaller the particle size the higher the reactivity of the product will be. Of course, the process can produce more than one of each of the above-named products. For example, more than one type, grade or class of metallic iron rich product may be generated, and the same holds true for both the iron oxide rich product and the silicate rich product. The different types of products may include varying degrees of iron content or other property or characteristic as desired.

While fresh steel making slags are dry, stored steel making slags may include moisture that can affect the separation of the various products from the materials. Accordingly, as shown in FIG. 1, a moisture removal step 20 may be performed prior to or at the time of grinding or otherwise reducing the size of the slag particles. Accordingly, a drying or moisture removing device can be installed prior to a crusher or grinding mill. Moisture removal can also be assisted or accomplished by draining, filtering or centrifuging, and may include a forced air flow or thermal drying process. A forced air flow can also be provided inside the grinding mill or crusher. Generally, significant heat is generated by friction as the metallic rich slag material is ground or crushed and so this process may have inherent drying capacity to remove a significant amount of moisture. However, if additional heat is desired, the air can be preheated before it is drawn into or forced through the mill.

In addition to potential moisture removal steps or procedures, additional treatment of the slag may be required prior to fine grinding or crushing of the slags. For example, this may be done to avoid materials too coarse from getting into the grinding mills or crushers. This can be done by screening and/or precrushing and at this phase, tramp materials can be removed. Crushing may be carried out with crushers of various type including, for example, pressure type and impact type crushers. Pressure type crusher may include, for example, jaw, cone, gyratory and roll crushers. Impact type crushers may include, for example, hammer mill and vertical and horizontal impact crushers.

To crush the slag, it can be fed into a crusher or a series of crushers for staged crushing. For example, a jaw crusher and a roll crusher can be combined for a two-stage crushing operation. In such an example, the jaw crusher may be utilized to reduce the slag material to about −½ inch particle size, which generally indicates that the particles will pass through a screen or other device having an average opening size of about ½ inch. Material of the noted particle size may then be fed into a roll crusher to further crush the material so it passes through a screen having an opening size on average of 4 mesh, 10 mesh, or any other size desired for a given application.

The screened, crushed or appropriate slag material may be further reduced in size by finely grinding it to liberate the mineral and metal components in the slag. The particle size for liberation of the mineral and the metal components depends at least in part on the operating condition of the steel mills and the type of slag being processed. In one example, the majority of the components can be liberated when the average particle size is in the range of 28-400 mesh. Representative grinding mills may include rod mills, ball mills, autogenous mills, conical mills, vertical roller mills, roller presses, jet mills and others. Like crushing, grinding can be achieved with a single mill or with a series of mills for stage grinding. And different types of grinding mills and devices can be employed in a staged grinding process.

The relatively dry and fine particle size material is then processed to separate it into various products or product groups. Generally, separation of the various mineral and metal components from the fine particle sized material is undertaken, in one implementation of the invention, by way of one or more of gravitational, and/or magnetic and/or particle size separation methods. The gravitational separation method may be achieved based on the differences in the specific gravities of metallic iron, iron oxide and silicates which have specific gravities of about 7.8, 5.2 and 3.0 g/cm$^3$, respectively. The magnetic separation methods may be employed based on the different magnetic susceptibilities of metallic iron, iron oxide and silicates, which are about 1, 0.1 and $10^{-6}$, respectively, in CGSM. The particle size separation may be achieved based on the tendencies for the different products to form different particle sizes during the crushing and/or grinding processes. In general, metallic iron is more malleable and during grinding tends to flatten out forming a larger particle size than the silicate particles. Silicates are more fragile than metallic iron and tend to form finer particles after grinding. Therefore, on average, the smaller particle fraction of the ground slag material tends to include a higher concentration of silicates than the larger particle size fraction of the ground slag material. Accordingly, the differences between the physical characteristics and properties of the end products provide a basis for the different methods of separation into one or more desired end products.

Figure 2:
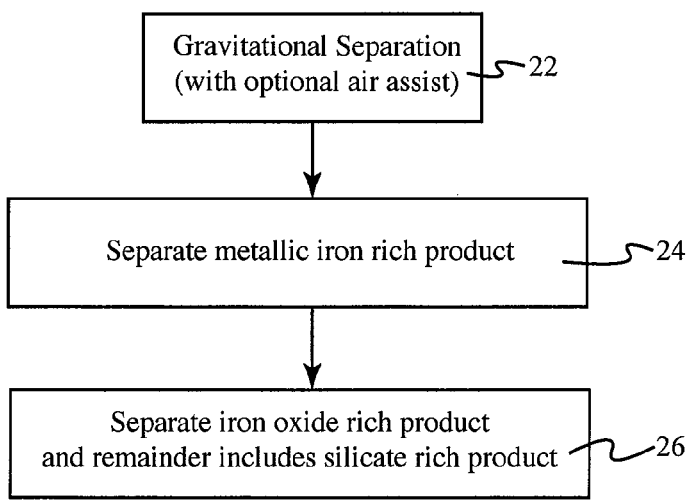
FIG. 2 is a diagram illustrating one method of processing slag using gravitational separation.

Gravitational separation 22 of the materials, as generally set forth in FIG. 2, can be carried out with devices such as an air aspirator, air table, air jig or cyclone. For example, one aspirator utilizes an upward air flow within a column to separate the materials. Heavier material sinks while lighter material is lifted, and by adjusting the air velocity, materials with different specific gravities can be separated in this manner. Baffles may be disposed in the column to assist in the separation. The air tables, air jigs and cyclones basically use the same air velocity principle to achieve separation.

Separation of the slag material into the various products can be conducted by setting the air velocity at a higher value to separate at 24 the heaviest product, which is the metallic iron rich product, in a sink or a lower collection area. Material not collected in the sink may include both iron oxide rich product and silicate rich product, and depending on the air velocity used in the separation, a certain amount of metallic iron rich product as well. Material not collected in the sink of the apparatus may be further separated at 26 at a lower air velocity. At a lower air velocity, heavier iron oxide rich product will be collected in a sink or lower collection area and a lighter silicate rich product may be collected in a lift or upper collection area. In at least some implementations, the air velocity may be between 0.001 m/sec to 15,000 m/sec, preferably between 0.1 m/sec to 2,000 m/sec and more preferably between 1 m/sec to 100 m/sec.

Of course, additional phases of gravitation separation may be employed. For example, the metallic iron rich product collected in the sink in the first phase of the gravitational separation may be processed again to divide or separate it into two end products having different iron content. The material may be subjected to a higher air velocity such that heavier products, generally higher in iron content, will be collected in the sink and less heavy materials, which may have a lower iron content, may be collected in the lift. The materials collected in the lift may be an iron oxide rich product, or a metallic iron rich product having a lower iron content than the materials collected in the sink. Using this process logic, phased gravitational separations with successive changes in the air velocities can generate a series of products that may have differing iron content.

Figure 3:
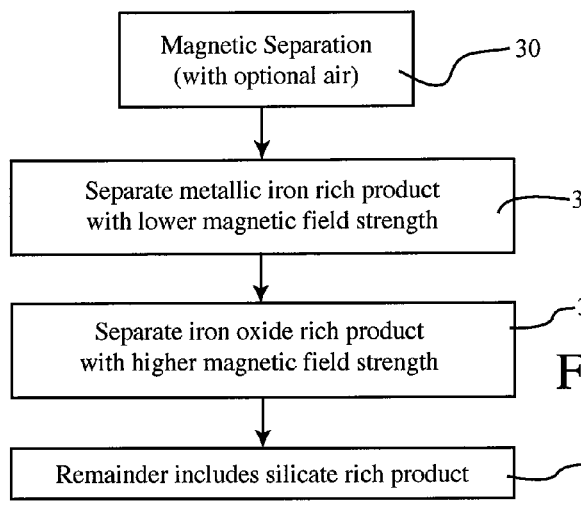
FIG. 3 is a diagram illustrating one method of processing slag using magnetic separation.

As generally shown in FIG. 3, the slag material may also be separated by use of a magnetic field at 30. For example, at 32 a lower magnetic field strength will attract the more highly magnetically susceptible metallic iron rich product from the slag material while failing to attract the remaining material. A second, higher magnetic field strength may be applied at 34 to the remaining material to separate out the iron oxide rich product which is more magnetically susceptible than the silicate rich product. The magnetic field strength can be adjusted by selecting the appropriate permanent magnet or by the use of an electromagnet. By way of example, the magnetic field strength can be in the range of 50 gauss to 20 Kilogauss. In one implementation it desirably was between 100 gauss and 10 Kilogauss, and was preferably between 500 gauss and 5 Kilogauss.

Further, in one presently preferred implementation, an air flow may be provided with the magnetic separation to lift or counteract the magnetic force and permit improved control over the separation process. Of course, the velocity of the air may be changed and with the adjustment of the air and magnetic forces, various products ranging from high iron content to low iron content can be generated. Air velocity can be controlled in different ways. One way is to carry all of the slag material in the air and cause it to pass through a magnetic separator. The higher the air velocity, the less a given particle tends to be attracted or held by the magnetic separator. Separation of metallic iron can, therefore, be accomplished by using lower magnetic field strength and/or higher air velocity. Iron oxide particles can be separated at higher magnetic field strength and/or lower air velocity. Finally, silicate particles have the lowest magnetic susceptibility and may therefore be rejected from the magnetic separator at appropriate magnetic field strengths and/or air velocities, as shown at 36 in FIG. 3.

Another way to control air velocity and magnetic separation is to blow or suck the slag material on a conveyor or moving bed disposed adjacent to or passing near a magnet. In the area of the magnet, magnetic force will attract or hold particles of a sufficient magnetic susceptibility and particles of less magnetic susceptibility or non magnetic particles will be blown or sucked away by the air. The speed of the moving conveyor or bed can also be a factor that may be adjusted to assist in the separation. Higher speeds can reduce the magnetic attraction and help the rejection of less magnetic particles. Lower speed helps retain the magnetic particles. In at least some implementations, the conveyer speed may be in the range of 0.1 m/min to 100 m/min, preferably between 0.5 m/min to 30 m/min and more preferably between 1 m/min and 20 m/min.

Figures 4, 6:
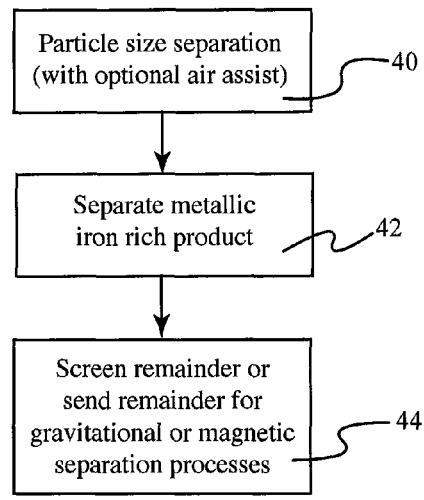
FIG. 4 is a diagram illustrating one method of processing slag using particle size separation.
FIG. 6 is a chart showing iron content of various sized particles of a supply of "c-scrap" slag material.

Separation based at least in part on particle size can also be performed, generally as shown in FIG. 4 at 40. Screening can facilitate the separation of various products in at least two ways. First, by initially screening the slag material into various size fractions or portions, the gravitational and/or magnetic separations can be undertaken for a less diverse size range of particles of material and can therefore be accomplished more efficiently. Another way the screening or size separation can help the separation of various particles is by separating out metallic iron product directly. In general, metallic iron is more malleable than the silicate product and is not easily broken during grinding. Accordingly, at least some of the metallic iron particles can be courser or larger than the rest of the particles after the crushing and/or grinding. This portion of the metallic iron can be screened out directly at 42 to be a portion of or a separate metallic iron rich product. The screening can be carried out with horizontal, inclined, vibrating and ultrasonic screen devices, for example. As shown at 44, the remainder of the material can be further screened to, for example separate out an iron-oxide rich product, or it may be processed by a different separation technique.

The particle size to screen out metallic iron in one implementation can range from 14 to 200 mesh, depending on the extent of grinding and/or crushing of the initial or input slag material. For a wide range of slags, a 35 or 65 mesh screening is generally appropriate to yield a metallic iron product having a desirably high iron content. The larger material particles separated out by screening can be further processed, such as by grinding or crushing and further separation including gravitational or magnetic separation or particle size screening, to provide products of varying iron content. Due to the abrasive nature of slag particles, it may be desirable, at least in some applications, to utilize the particle size separation as a secondary separation process to limit the amount of material that passes through a given screen. Of course, despite this consideration, particle size separation can be employed as the primary separation method as desired.

Figure 5:
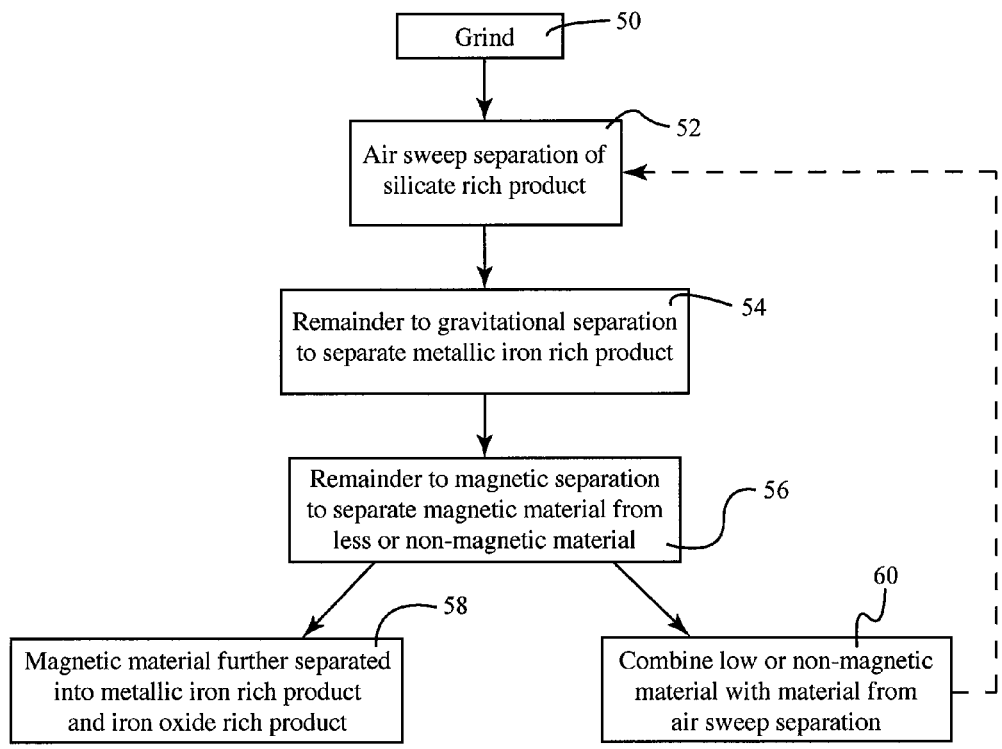
FIG. 5 is a diagram showing one implementation of a method of processing slag using a combination of separation techniques.

The various separation processes and techniques described herein are not mutually exclusive. Each of the techniques and processes may be combined with other techniques and processes for separating the slag material into various products. For example, as shown in FIG. 5, while the slag material is being ground at 50, an air flow can be provided to remove the lightest materials at 52, including silicate rich product. Thereafter, the heavier remaining portions of the ground material can be subjected to a gravitational separation at 54 providing, for example, a metallic iron rich product in the sink and, the remainder, which may include an iron oxide rich product, in the lift. The remainder can be subjected to a magnetic separation process at 56 to yield a first more highly magnetic product and a second, less magnetic product. Each of these products may be further processed by any of the processing techniques to provide still further product groups or fractions having varying iron content. By way of example, the more magnetic material may be subjected to further magnetic separation at 58 to provide a metallic iron rich product and an iron oxide rich product. One or more of the products from the various processes can be combined together, such as shown at 60, usually by combination of relatively similar iron content products from one or more groups.

In this manner, one or more metallic iron rich products may be separated from the slag along with one or more iron oxide rich products and one or more silicate rich products. Each of these products may have varying uses in different industries or applications and may have its own commercial value. In addition, the extent to which metallic iron is separated from the silicate rich product, for example, may be depend on the particular industry or application to which the end product will be used. For example, there are applications for the silicate rich product wherein metallic iron can be detrimental, or undesired. For example, the cement industry can use the silicate rich product as a raw material for clinker manufacturing if the metallic iron is sufficiently removed. Accordingly, to provide a silicate rich product for such an application, the silicate rich product may be subjected to several phases of separation to ensure sufficient metallic iron removal.

In another example, the slag material may be ground and than magnetically separated to yield a metallic iron rich product separated from the remainder of the slag material. The remainder of the slag material can be magnetically separated further at a higher magnetic force to separate from the remaining material a product that is less magnetically susceptible than the first metallic iron rich product previously separated. This second, less magnetic product may be an iron oxide rich product. The remaining material may be a silicate rich product. Each of the products separated from the initial slag material can be further processed to again provide groups or fractions of products of varying iron content. For example, the iron oxide rich product can be further separated into two groups each of which may fall within the "iron oxide rich product" category but have varying total iron content.

In a first exemplary experimentation, a sample of "c-scrap" slag was analyzed to determine the iron content based on particle size. The results of that analysis are contained in the chart of FIG. 6 which demonstrates that the larger particles generally contain a higher total iron content than the smaller particles. C-scrap material generally comprises −⅜ inch magnetic material that is a portion of the BOF slag. The −3/8 inch designation means that the material passed through a screen or other separator having an average opening size of 3/8 inch.

This c-scrap slag material was then crushed to pass through a 10 mesh screen and fed into a rod mill. After 30 minutes of grinding, the material had a reduced average particle size and the material was gravitationally separated with an air aspirator. By adjusting the air velocity, three products were obtained. A metallic iron rich product was produced in the sink fraction with an air velocity at 70 ft/sec. An iron oxide rich product was lifted with an air velocity at 70 ft/sec but sank at an air velocity of 47 ft/sec. The silicate rich product was generated by collecting the lifted material at 47 ft/sec air velocity. The total iron content of the metallic iron rich product was 92.88%, the iron oxide rich product had an iron content of 68.72%, and the silicate rich product had an iron content of 24.24%. The silicate rich product was separated based on particle size and the percent by weight for each size group is reported in the table below.

| Size (Mesh) | Size (Microns) | Wt. % | Cumulative Wt. % |
| --- | --- | --- | --- |
| +35 mesh | 420 | 3.11 | 3.11 |
| +48 mesh | 297 | 1.70 | 4.81 |
| +65 mesh | 210 | 27.97 | 32.78 |
| +100 mesh | 149 | 18.64 | 51.42 |
| +150 mesh | 105 | 10.45 | 61.87 |
| +200 mesh | 74 | 11.86 | 73.73 |
| +270 mesh | 53 | 5.08 | 78.81 |
| −270 mesh | 44 | 21.19 | 100.00 |

The iron oxide rich product, which contained 68.72% iron was further magnetically separated in an air swept magnetic separator. The two products obtained from the separation included a metallic iron rich product having 78.79% iron and a iron oxide rich product having 62.02% iron.

The silicate rich product, which contained 24.24% iron, was also further separated with an air swept magnetic separator. The two products obtained from that separation included an iron oxide rich product having 61.27% iron and a silicate rich product having 18.73% iron. Finally, the metallic iron rich product generated from the further possessing of the original iron oxide rich product and which contained 78.79% iron as noted above, was screened at 65 mesh. The product that did not pass through the screen and hence, was coarser than 65 mesh, contained 87.22% iron which is a metallic iron rich product with higher iron content than the total product group prior to the screening operation. The portion of the metallic iron rich product which passed through the 65 mesh screen had an iron content of 72.42%. In the current market, the higher iron content product can sell for a higher price, thus justifying the further separation of the original metallic iron rich product. Of course, the above description is set forth in view of presently preferred embodiments and is not intended to limit the invention in any way. There can be many other variations and combinations of the separation techniques and processes disclosed herein. All such variations and combinations are intended to fall within the spirit and scope of this invention, as set forth in the following claims.

The invention claimed is:

1. A process, comprising:
applying a forced air flow to slag materials from a steelmaking process to separate the slag materials into at least an iron rich product and a silicate rich product based on the differences between these products in at least one of particle size or specific gravity wherein the forced air is applied in at least two phases wherein in a first phase an air flow at a first velocity is applied to the material to facilitate separating out the lowest specific gravity portion of the material which provides a silicate rich product and in a second phase an air flow at a second velocity greater than the first velocity is applied to the remaining material to facilitate separation of the remaining material into a metallic iron rich product and an iron oxide rich product.

2. The process of claim 1 which also includes applying a magnetic field to the iron oxide rich product to facilitate separating that product into two groups based on differences in magnetic susceptibility.

3. The process of claim 1 which also includes screening the iron oxide rich product with a screen having an average opening size selected to facilitate separating that product into a metallic iron rich product and an iron oxide rich product.

4. The process of claim 1 which also includes applying a magnetic field to the material at the same time that the forced air flow is applied to the material so that the material may be separated into at least two groups.

5. A process, comprising:
reducing the average particle size of slag from a steelmaking process into fine particle size material including metallic iron rich particles and silicate rich particles; and
separating the fine particle size material into at least an iron rich product and a silicate rich product based on the differences between metallic iron rich particles and silicate rich particles in at least one or more properties including magnetic susceptibility, particle size or specific gravity, wherein the fine particle size material is separated by applying an air flow to the material and carrying the particles along in the air flow and applying a magnetic field to the air flow and particles.

6. A process, comprising:
reducing the average size of slag from a steelmaking process;
providing a forced air flow onto the slag while the size of the slag is being reduced to remove the lightest materials from the slag;
separating the slag, after its size has been reduced, into at least an iron rich product and a silicate rich product based on the differences between these products in magnetic susceptibility by simultaneously providing both a magnetic field and a forced air flow onto the ground slag.

7. The process of claim 6 wherein material is separated by applying a magnetic field in at least two phases wherein in a first phase a magnetic field of a first strength is applied to the material to separate out a metallic iron rich product and in a second phase a magnetic field at a strength that is greater than the first strength is applied to the material remaining after the first phase to separate the remaining material into an iron oxide rich product and a silicate rich product.

8. The process of claim 6 wherein the step of reducing the average size of the slag renders the material able to pass through a screen having an average opening size of between 2-mesh and 200-mesh.

9. The process of claim 8 wherein the average opening size is between 4-mesh and 100-mesh.

10. The process of claim 6 wherein after the step of reducing the average size of the slag, the slag is separated by passing the slag through a screen having an average opening size selected to prevent passage through the openings of the screen of the metallic iron rich product.

11. The process of claim 10 wherein the screen has an average opening size of between 30-mesh and 80-mesh.

12. The process of claim 10 wherein the material that passed through the screen is further screened with a second screen having a smaller average pore size to prevent passage through the second screen of an iron oxide rich product while permitting passage through the second screen of a silicate rich product.

13. The process of claim 10 wherein the material that passes through the screen is subjected to a magnetic field to separate that material based on differences in the magnetic susceptibility of the components of the material.

14. The process of claim 13 wherein the strength of the magnetic field is chosen to attract iron oxide rich product with the product not attracted by the magnetic field being a silicate rich product.

15. The process of claim 6 wherein the iron rich product includes iron oxide rich product and metallic iron rich product.

16. The process of claim 6 wherein the magnetic field strength is in the range of 50 gauss to 20 Kilogauss.

17. The process of claim 6 wherein the magnetic field strength is in the range of 100 gauss and 10 Kilogauss.

18. The process of claim 6 wherein the air velocity may be between 0.001 msec to 15,000 msec.

19. The process of claim 6 wherein the air velocity may be between 0.1 msec to 2,000 in/sec.

20. The process of claim 6 wherein after the step of reducing the average size of the slag, more than 10% of the slag is less than 44 microns in size.

\* \* \* \* \*